United States Patent

Chao

Patent Number: 5,938,315
Date of Patent: Aug. 17, 1999

[54] FULL-IMAGE OPTICAL PROJECTING FENCE ASSEMBLY

[75] Inventor: Li-Ming Chao, Taipei, Taiwan

[73] Assignee: Ably Win International Co., Ltd., Taipei, Taiwan

[21] Appl. No.: 09/025,306

[22] Filed: Feb. 18, 1998

[30] Foreign Application Priority Data

Jul. 21, 1997 [TW] Taiwan ................................. 86212213

[51] Int. Cl.⁶ .................................................... F21K 7/00
[52] U.S. Cl. .............................. 362/259; 353/42; 362/109
[58] Field of Search .............................. 353/42; 362/109, 362/118, 259, 253

[56] References Cited

U.S. PATENT DOCUMENTS 5,788,359  8/1998  Halsey et al. ............................ 362/118

Primary Examiner—Stephen Husar
Attorney, Agent, or Firm—Rosenberg, Klein & Bilker

[57] ABSTRACT

A full-image optical fence assembly for laser pointer comprising a sleeve and an optical fence is provided. The sleeve is preferably made from resilient material and includes an aperture in the front portion, and a fence mounting. Wherein the optical fence can be fixedly attached to the fence mounting. The sleeve further includes a connecting portion that has a flare shape for readily enveloping onto the tip of the laser pointer. The optical fence assembly can be readily attached to the tip of different laser pointer. The engagement between the sleeve and the tip of laser pointer is firm. A preferable waterproof and shockproof capability are provided.

5 Claims, 5 Drawing Sheets

FULL-IMAGE OPTICAL PROJECTING FENCE ASSEMBLY

FIELD OF THE INVENTION

The present invention relates to an optical fence, more particularly, to a full-image, optical projecting fence assembly that can be installed onto the tip of a laser pointer of different types.

DESCRIPTION OF PRIOR ART

As shown in FIG. 1, the laser pointer 10a is a light projecting device that may project a light spot onto a specified location. In the conventional laser pointer, the pen-shape laser pointer includes a push button switch 11a that is projected over the surface the pointer. By the manipulation of the push button switch, the laser beam can be generated and spot onto a certain area. As a result, the audience can be readily oriented by the speaker through the application of the laser pointer during a presentation.

Nevertheless, the pattern of the spot generated by the conventional laser pointer is merely a point, in order to adapt for certain application, a built-in optical fence (not shown) is directly installed within the laser pointer 10a. When the laser pointer 10a is switched on, the laser beam may pass through the fence and a pattern spot can be shown in the screen. However, once the optical fence is installed, the original point spot is compromised.

In order to solve this problem, another conventional laser pointer 10a has provided with a removable full-image optical fence 12a. On the other hand, a fixed optical fence 15a is built-in the laser pointer 10a. A mounting post 13a can be installed into a retaining hole 14a located on the tip of the laser pointer. By this arrangement, the removable full-image optical fence 12a may readily attached to the tip of the laser pointer 10a. By this arrangement, when the laser beam is generated and passed through the fixed and removable optical fences 15a and 12a, different type of spot can be attained. On the other hand, as the removable optical fence 12a can be made with different patterns, a variety of spots can be readily attained.

However, the conventional removable optical fence 12a may only be attached to the tip of the laser pointer 10a that has a specified design. Accordingly, not every conventional laser pointer can install this removable optical fence. Furthermore, when the fixed optical fence 15a is connected with the full-image optical fence 12a through the interference-fit, the original pattern of the optical fence 15a has been squeezed to deform. An optical distortion will be experienced. Besides, the size of the laser pointer is quite small that is difficult to assemble, especially in the connection between the mounting post 13a and retaining hole 14a. On the other hand, as the connecting point is quite small, the mounting post 13a may readily get lost. The conventional laser pointer has a poor water resistance. Besides, the conventional laser pointer has a poor shock-resistance and once the laser pointer experiences a shock or impact, the focusing point between the lens and the light emitting device will be changed.

SUMMARY OF THE INVENTION

It is the objective of this invention to provide a full-image optical fence assembly that can be readily attach to the tip of a laser pointer.

It is still the objective of this invention to provide a full-image optical fence assembly that can be readily attached to the tip of different laser pointer. The engagement between the sleeve and the tip of laser pointer is firm and durable. A preferable waterproof and shockproof capability are provided.

In order to achieve the objective set forth, a full-image optical fence assembly for laser pointer comprising a sleeve and an optical fence is provided. The sleeve is preferably made from resilient material and includes an aperture in the front portion, and a fence mounting. Wherein the optical fence can be fixedly attached to the fence mounting. The sleeve further includes a connecting portion that has a flare shape for readily enveloping onto the tip of the laser pointer. The optical fence assembly can be readily attached to the tip of different laser pointer. The engagement between the sleeve and the tip of laser pointer is firm. A preferable waterproof and shockproof capability are provided.

According to one aspect of the present invention, the sleeve can be tightly engaged with the laser pointer and the optical fence to prevent the deformation of the optical fence.

According to another aspect of the present invention, the resilient sleeve may serve as a buffer to absorb the shock or vibration once the laser pointer is accidentally dropped.

According to still an aspect of the present invention, the push button switch is suitably spaced by the thickness of the sleeve. As a result, the false trigger of the push button switch can be suitably prevented.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
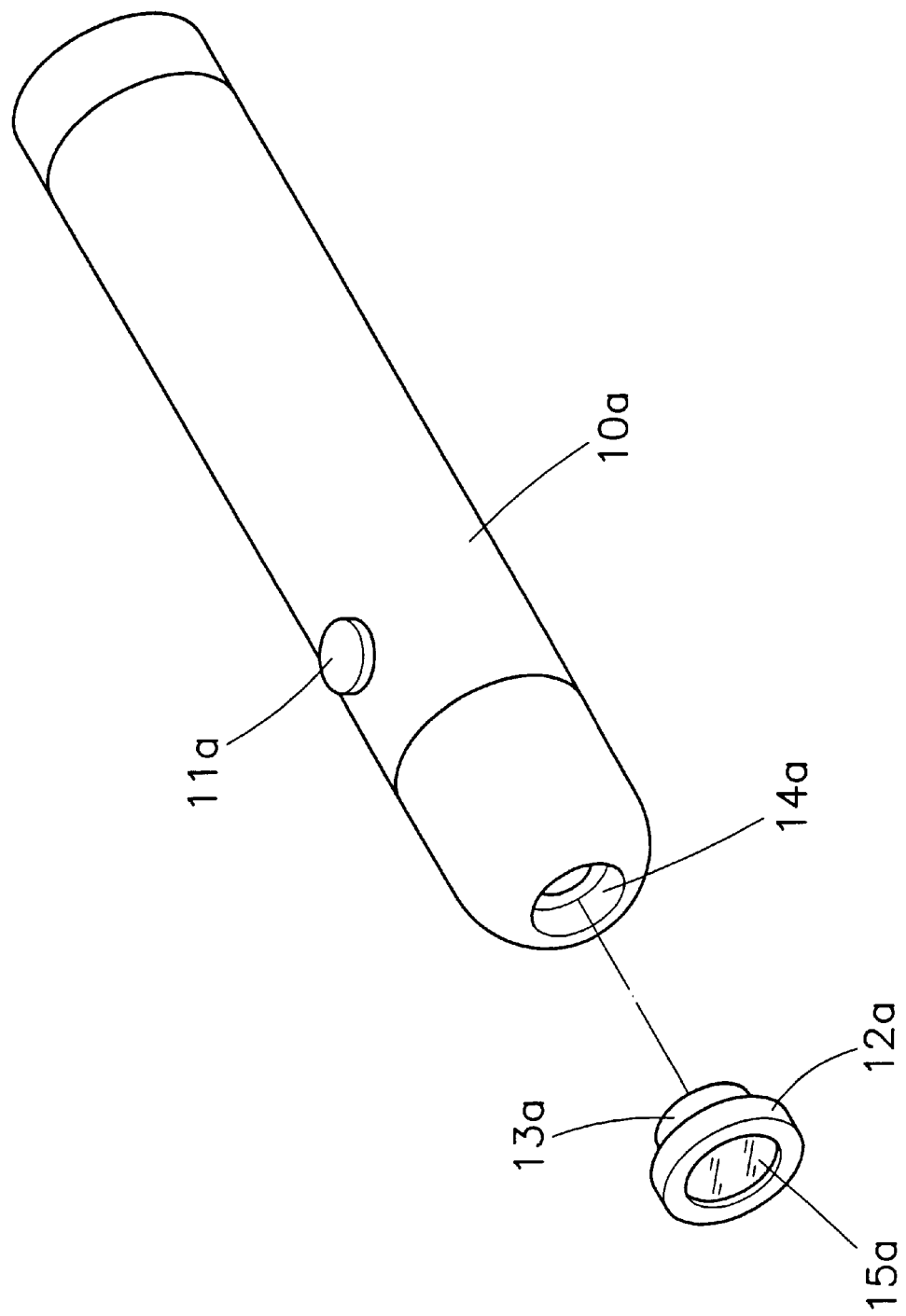
FIG. 1 is a perspective view of a conventional laser pointer showing the lens arrangement thereof.
Figure 2:
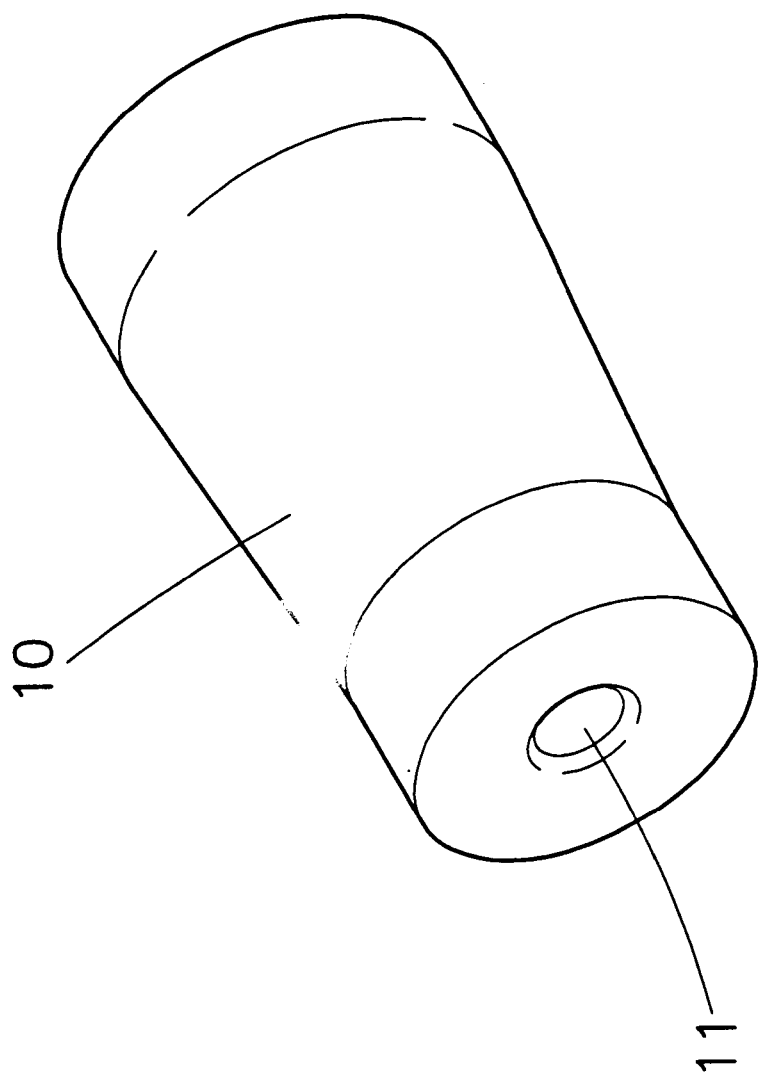
FIG. 2 is a perspective view of the laser pointer made according to the present invention.
Figure 3:
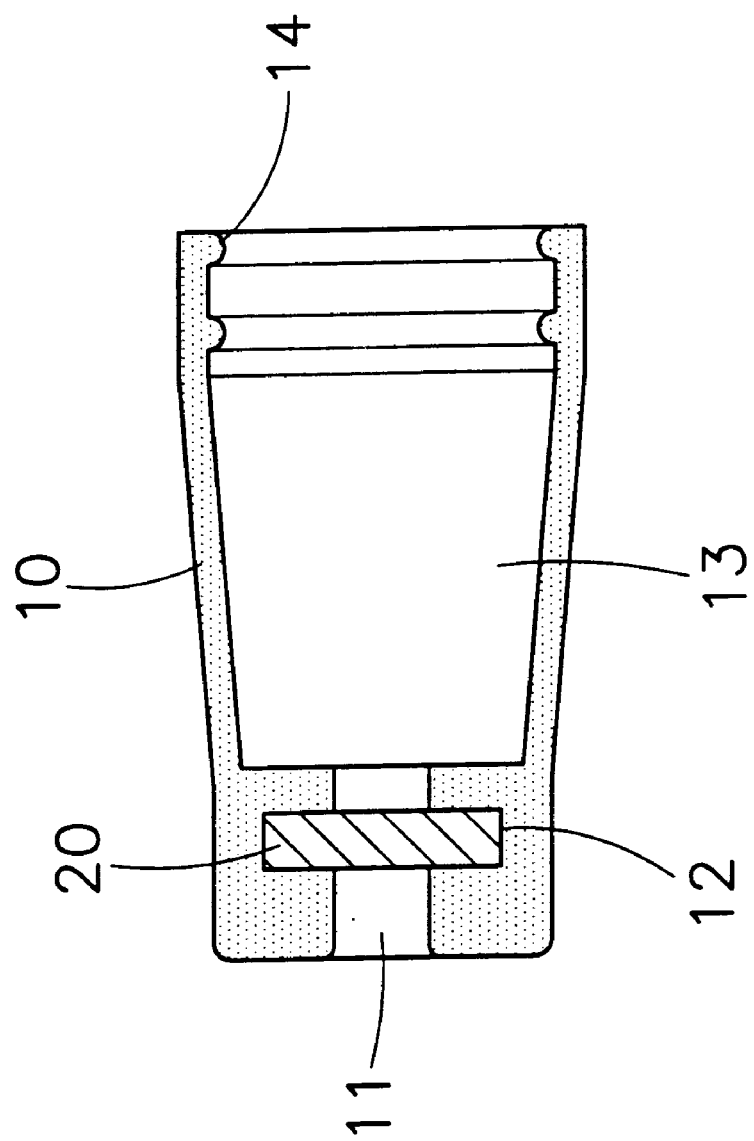
FIG. 3 is a cross sectional view of the laser pointer.

Referring to FIGS. 2 and 3, the perspective and cross sectional views of the optical fence assembly are described, respectively. The optical fence assembly generally comprises a sleeve 10 and an optical fence 20. The sleeve 10 is preferably made from resilient material, such as rubber. The sleeve 10 includes an aperture 11 and a fence mounting 12 that is arranged within the aperture 11. The optical fence 20 can be readily mounted within the fence mounting 12. The pattern of the optical fence 20 can be readily arranged according to the requirement. The sleeve 10 has a connecting portion 13 that has a flare shape and can be readily connected to the tip of a laser pointer. The inner wall of the connecting portion 13 is provided with a plurality of gripping rings 14 for effectively engagement with the tip of the laser pointer. When the optical fence assembly is attached to the tip of the laser pointer, a plurality of patterns of spot can be attained.

Figure 4:
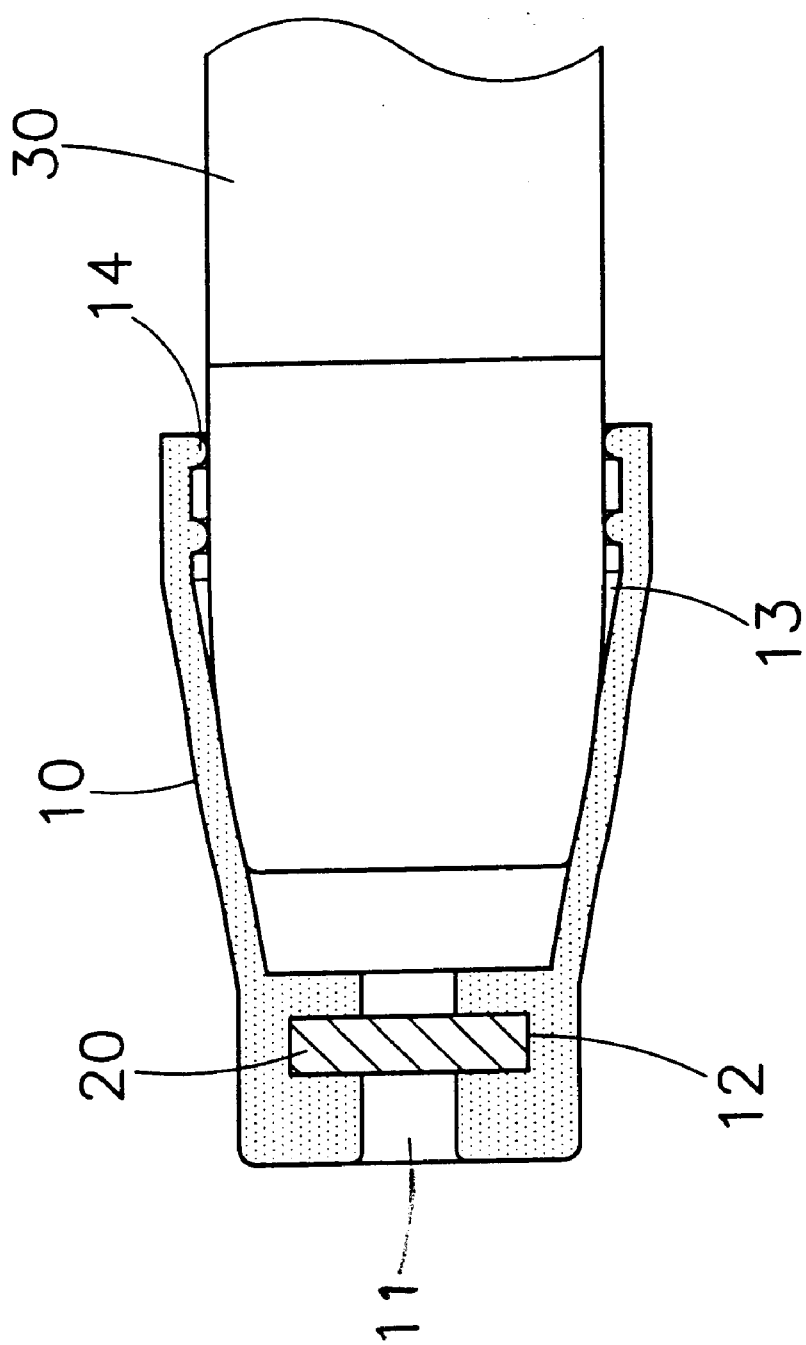
FIG. 4 is a schematic illustration showing the application of the laser pointer made according to the present invention.

Referring to FIG. 4, the sleeve 10 can be readily attached to the tip of the laser pointer 30 through the connecting portion 13. When the laser pointer is switched on and the laser beam may project through the optical fence 20 and the aperture 11 and finally reaches to a screen. When the laser beam passes through he optical fence 20, part of the laser beam is masked and a pre-designed pattern is presented on the screen.

Since the sleeve 10 is made from resilient material, it can be readily enveloped onto the tip of different existing laser pointer 30. Even to the laser pointer yet marketed, the sleeve 10 may still readily attach thereof. Besides, the sleeve 10 may also tightly engage with the laser pointer 30 and the optical fence 20, it is inherited with excellent water-resistance and dust proof.

Furthermore, the sleeve 10 can be also made from fluorescent material and attached to the rear end of the laser pointer 30. By this arrangement, the laser pointer 30 can be readily recognized even in the darkness. As the sleeve 10 is made from resilient material, it may serve as an excellent buffer. When the laser pointer 30 is accidentally dropped to the ground, the shock or vibration can be properly absorbed by the sleeve 10. Accordingly, the laser circuit and the optical device can be suitably protected.

Figure 5:
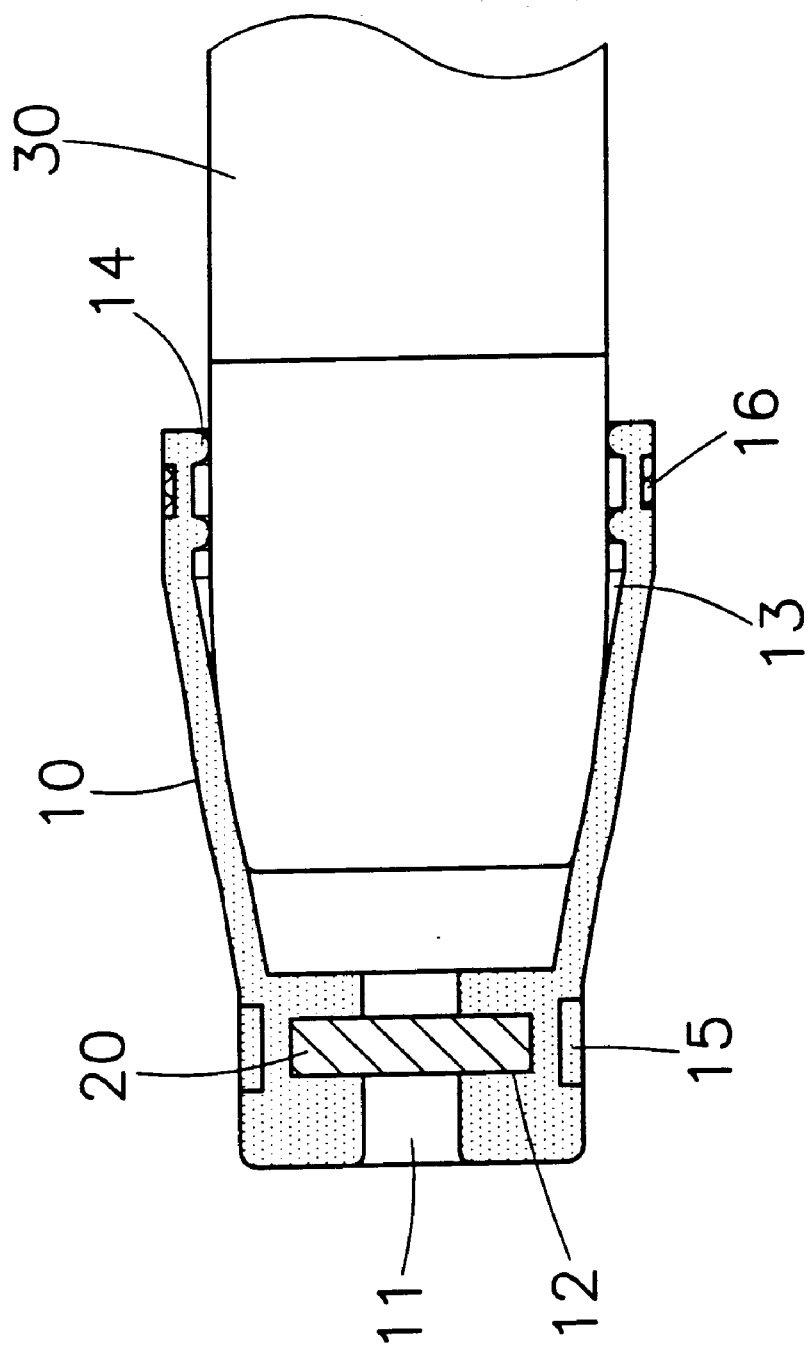
FIG. 5 is still a schematic illustration showing the application of the laser pointer made according to the present invention.

Referring to FIG. 5, another embodiment of the optical fence assembly is shown. The front outer wall of the sleeve 10 is provided with a positioning ring 15 corresponding to the optical fence 20. The positioning ring 15 is used to limit the expansion of the sleeve 10 adjacent to the optical fence 20. As a result, the optical fence 20 can be fixedly attached to the fence mounting 12 of the sleeve 10. This benefits an excellent waterproof capability. On the other hand, a second positioning ring 16 can be arranged on the rear end of the sleeve 10 to limit the expansion thereof. Consequently, a tight engagement between the rear end of the sleeve 10 and the laser pointer 30 can be attained. This may also increase the waterproof capability thereof.

From the forgoing description, the optical fence assembly suggested accordingly may readily solve the problems, complicate assembling, poor waterproof and easy disengagement between the optical fence and laser pointer, encountered by the existing laser pointer.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A full-image optical fence assembly for laser pointer, comprising a sleeve and an optical fence, said sleeve being preferably made from resilient material and including an aperture in the front portion, and a fence mounting, wherein said optical fence can be fixedly attached to said fence mounting, said sleeve further including a connecting portion that has a flare shape for readily enveloping onto the tip of the laser pointer.

2. A full-image optical fence assembly for laser pointer as recited in claim 1, wherein the inner wall of said connecting portion is provided with gripping ring.

3. A full-image optical fence assembly for laser pointer as recited in claim 1, wherein the front outer wall of said sleeve is provided with a first positioning ring corresponding to the optical fence.

4. A full-image optical fence assembly for laser pointer as recited in claim 1, wherein said sleeve further includes a second positioning ring at the rear end.

5. A full-image optical fence assembly for laser pointer as recited in claim 1, wherein said sleeve can be made from fluorescent material.

* * * * *